United States Patent [19]

Narbutt et al.

[11] Patent Number: 4,755,322
[45] Date of Patent: Jul. 5, 1988

[54] METHOD OF OBTAINING COMPOSITE ION EXCHANGERS

[75] Inventors: Jerry Narbutt, Paziń skiego; Barbara Bartoś, Hauke Bosaka; Aleksander Bilewicz, Krochmalna; Zdzislaw Szeglowski, Bronowicka, all of Poland

[73] Assignee: Instytut Chemii I Techniki Jadrowej, Warsaw, Poland

[21] Appl. No.: 901,270

[22] Filed: Aug. 27, 1986

[30] Foreign Application Priority Data

Aug. 30, 1985 [PL] Poland ................................ 255191

[51] Int. Cl.$^4$ .......................... C09K 3/00; C08G 8/18
[52] U.S. Cl. ...................................... 252/184; 521/39; 423/658.5
[58] Field of Search ................ 252/184, 179; 502/62, 502/402, 8; 521/39; 428/658.5

[56] References Cited

U.S. PATENT DOCUMENTS

| | | | |
|---|---|---|---|
| 2,521,288 | 9/1950 | Evers | 521/39 X |
| 3,892,709 | 7/1975 | Oda et al. | 502/402 X |
| 3,951,859 | 4/1976 | Inaba et al. | 502/402 X |
| 4,081,401 | 3/1978 | Takegami et al. | 502/402 |
| 4,140,653 | 2/1979 | Imura et al. | 502/402 X |
| 4,164,482 | 8/1979 | Berger et al. | 502/402 X |
| 4,178,270 | 12/1979 | Fujita et al. | 252/184 |
| 4,284,726 | 8/1981 | Shigetomi | 521/28 |
| 4,316,819 | 2/1982 | Tu et al. | 502/62 |
| 4,362,626 | 12/1982 | Takeuchi et al. | 502/402 X |
| 4,386,006 | 5/1983 | Harrington | 252/184 |
| 4,576,969 | 3/1986 | Echigo et al. | 521/39 X |
| 4,661,327 | 4/1987 | Horton | 423/658.5 X |

FOREIGN PATENT DOCUMENTS 1012969  4/1983  U.S.S.R. ............................ 252/184

OTHER PUBLICATIONS

Pekarek et al., "Synthetic Inorganic Ion Exchangers-II . . . " *Talanta* (1972) vol. 19, pp 1245-1283.
De et al., "Review Synthetic Inorganic Ion-Exchangers", *Separation Science and Technology*, 13 (6), (1978) pp 517-519, 534-535.
Amphlett, C. B., *Inorganic Ion Exchangers*, Elsevier Publ. B. Amsterdam, 1964, pp 6-7.
Caletka et al. "Adsorption Properties of Amonium Molybdophosphate . . . ", *Radiochem. Radioanal. Letters*, 12 (6), (1972) pp 325-329.
J. Nucl. Science and Technol., "Insolation of $^{137}$Cs With Copper Ferrocyanide-Anion" pp 32-36, vol. 4 (4) (1967).
J. Radional. Chem., "Improved Inorganic Ion Exchangers, " J. Stejskal et al., pp 371-379, vol. 21 (1974).

*Primary Examiner*—Matthew A. Thexton
*Attorney, Agent, or Firm*—Ladas & Parry

[57] ABSTRACT

This invention relates to a method of obtaining composite ion exchangers by implanting active inorganic sorbents into a matrix of an organic carrier. The inorganic sorbents are ferrocynides of various metals, hydrated antimony pentoxide, zirconium or titanium phosphates, and natural or synthetic zeolites. The matrix of the composite sorbents is a resin formed from formaldehyde cross-linked sulphonated phenols. Powdered inorganic sorbent is added to the reaction mixture in the process of polycondensation of the matrix. The main advantages of the obtained composite sorbents are improved mechanical stability and the spherical shape of the sorbent beads, decreased solubility of the inorganic component in water, and relatively fast kinetics of the ion exchange process.

8 Claims, No Drawings

METHOD OF OBTAINING COMPOSITE ION EXCHANGERS

BACKGROUND OF THE INVENTION

1. Field of the Invention

This invention relates to a method of obtaining composite ion exchangers which are formed as a result of implanting inorganic sorbents or ion exchangers of specific sorptive properties into a polycondensation matrix of an organic carrier.

2. Description of the Prior Art

Numerous inorganic sorbents and ion exchangers are strongly selective in relation to some metal ions. For example, ferrocyanides of bivalent metals efficiently sorb cesium ions, while hydrated oxide of pentavalent antimony selectively sorbs sodium ions from acidic solutions. Ferrocyanide sorbents are widely applicable for purifying liquid radioactive wastes from $^{137}Cs$ (V. Pedarek, V. Vesely, Talanta, 19, 1972, 1245). Hydrated antimony pentoxide is frequently used in neutron activation analysis to remove $^{24}Na$ from activated samples of biological materials (A.K.De, A.K.Sen, Sep.Sci.-Techn., 13, 1978, 517).

However, the inorganic sorbents have some disadvantageous properties, undesirable in practice, such as poor mechanical strength, irregular shape of the sorbent grains, relatively high solubility in water, slow kinetics of the ion exchange process, as well as rather high density (C.B.Amphlett, "Inorganic Ion Exchangers", Elsevier Publ.Co., Amsterdam, 1964).

Several methods are known to modify some properties of the inorganic sorbents, wherein the sorbents are transformed into composite materials. For instance, some inorganic sorbents are deposited on carriers such as anion-exchange resins (K.Watari, K.Imai, M.Izawa, J.Nucl.Sci.Technol., 4, 1967, 190) or inorganic sorbents (R.Caletka, C.Konecny, Radiochem. Radioanal. Letters, 12, 1972, 325). Other composite sorbents are obtained by processing powdered inorganic sorbents with various polymers dissolved in organic solvents, followed by evaporation of the solvent (J.Stejskal et al, J. Radioanal. Chem., 21, 1974, 371). It is in this way that composite ferrocyanide sorbents (S.U. Pat. No. 1,012,969, Apr. 23, 1983) as well as composite aluminosilicate sorbents (U.S. Pat. No. 4,316,819, Feb. 23, 1982) were obtained in order to improve stability and to decrease solubility in water of the inorganic filler. However, the above mentioned methods are not always efficient in producing the composite sorbents of required physico-chemical properties.

Another method allows to obtain the composite sorbents in the form of spherical beads by adding some metal salts or oxides to the reaction mixture in the polycondensation process of phenols and aldehydes, followed by processing the obtained product with aqueous solutions of alkalia, which transforms the implanted salts or oxides into active inorganic sorbents (Jap. Pat. No. 5,969,151, Apr. 19, 1984). There is still another way to obtain composite sorbents of hydrated titanium, zirconium, or stannic oxide in organic matrices, based on curing a mixture consisting of one of the given metal oxides and an epoxy, unsaturated polyester or polyurethane resin (U.S. Pat. No. 4,362,626, Dec.7, 1982). Large but still limited number of the composite sorbents can be obtained using the above methods.

SUMMARY OF THE INVENTION

It is the object of this invention to obtain the composite sorbents by introducng powdered active inorganic sorbents into the reaction mixture in the process of synthesis of the matrix of the composite sorbent. As the inorganic sorbents we understand ferrocyanides containing at least one of the following metals: cobalt, iron, nickel, copper, manganese, zinc, titanium, cadmium, zirconium, chromium, vanadium, lead, molybdenum, calcium and magnesium. The following compounds also belong to the said inorganic sorbents: hydrated antimony pentoxide, zirconium or titanium phosphates, and natural or synthetic zeolites. The matrix of the composite sorbents is a resin formed from phenol or its derivatives cross-linked with an aldehyde, preferably by formaldehyde.

Ground inorganic sorbent of linear dimensions of grains not exceeding 1 mm, desirably below 0.03 mm, is added to one of the substrates or to the reaction mixture in the process of synthesis of the matrix. The synthesis is the process of polycondensation of a compound selected from the group of phenols with an aldehyde in the presence of a mineral acid, preferably $H_2SO_4$, as a catalyst, preferably the polycondensation of sulphonated phenol with formaldehyde.

The composite ion exchangers obtained by the method of the invention contain the inorganic sorbent in the quantity of 1 to 80 mass % of the composite ion exchanger. The said composite ion exchangers are characterized by improved, high mechanical resistance, decreased solubility of an inorganic component in water and not too high density. Hard spherical beads of the composite sorbent of the required granulation are obtained when the process of synthesis is carried out by the method of pearl polycondensation. Powdering and dispersing the inorganic sorbent in the material of the matrix, the presence of hydrophilic functional groups, as well as the cross-linked structure of the said material cause advantageous effects on the kinetics of the ion exchange on the said composite ion exchangers.

DESCRIPTION OF THE PREFERRED EMBODIMENTS

The following examples are provided to illustrate the preferred embodiments of the invention.

EXAMPLE 1

Manufacturing of the composite ion exchanger with titanium ferrocyanide.

25 grams of molten phenol are added to 33 grams of concentrated sulphuric acid and the sulphonation of phenol is carried out at the temperature of 120° C. over a period of two hours. The sulphomass obtained is then cooled to a temperature of 20° C. and 10 grams of 40% aqueous solution of formaldehyde are dropped into it at such a rate that the temperature of the reaction mixture should not exceed 50° C. The solution obtained is cooled again to a temperature of 20° C. and mixed with 3 grams of 40% aqueous solution of formaldehyde. 17 grams of powdered titanium ferrocyanide are then added to the above mixture and suspended. The suspension of titanium ferrocyanide is then slowly poured into 500 grams of oil heated up to a temperature of 90° C. with vigorous stirring. This disperses the suspension into small drops which harden within a period of several minutes, forming spherical beads of the composite ion exchanger. The beads are then separated from oil, degreased and dried. 42 grams of the composite material containihng 20% of titanium ferrocyanide are obtained. The sorbent obtained has high selectivity towards cesium ions, the distribution coefficient of Cs+ from 0.1 molar solution of ammonium nitrate being equal to $5 \cdot 10^3$ cm$^3$/g.

EXAMPLE 2

Manufacturing of the composite ion exchanger with mordenite 20 grams of molten phenol are added to 26 grams of concentrated sulphuric acid and the mixture is heated at a temperature of 120° C. over a period of two hours. The sulphomass obtained is then cooled to a temperature of 20° C. and 8 grams of 40% aqueous solution of formaldehyde is added to it while keeping the temperture of the mixture below 50° C. The solution obtained is then cooled to a temperature of 20° C. and mixed with 2.5 grams of 40% aqueous solution of formaldehyde, and then with 40 grams of powdered mordenite. The prepared suspension of mordenite is then slowly poured down into 400 grams of oil heated up to a temperature of 90° C. The stirrer placed inside the vessel with oil disperses the suspension into small drops which harden within a period of several minutes, forming spherical beads. The beads are then separated from oil, degreased and dried. 30 grams of the composite ion exchanger containing 40% of mordenite are obtained. The granulation of the main fraction of the sorbent is in the range of 0.3 to 1 mm. The ion exchanger obtained efficiently sorbs cesium ions from aqueous solutions.

EXAMPLE 3

Manufacturing of the composite ion exchanger with hydrated antimony pentoxide 25 grams of molten phenol are added to 33 grams of concentrated sulphuric acid and the sulphonation of phenol is carried out at a temperature of 120° C. over a period of two hours. Then, after cooling the sulphomass obtained to a temperature of 20° C., 10 grams of 40% aqueous solution of formaldehyde are dropped into it while keeping the temperature of the reaction mixture below 50° C. The obtained solution is then cooled to a temperature of 20° C. and mixed with 3 grams of 40% aqueous solution of formaldehyde, and then with 150 grams of powdered hydrated antimony pentoxide. The suspension obtained is poured with vigorous stirring into 500 grams of oil heated up to a temperature of 90° C. The stirrer disperses the suspension into small drops which harden within a period of several minutes. The beads obtained in such a way are then separated from oil, degreased and dried. About 200 grams of the composite ion exchanger containing 70% of hydrated antimony pentoxide are obtained. The granulation of the sorbent is in the range of 0.05 to 5 mm. The sorbent obtained shows high selectivity towards sodium ions. The distribution coefficient of sodium ions in 5 molar HCl solution is equal to $1.9 \cdot 10^3$ cm$^3$/g.

EXAMPLE 4

Manufacturing of the composite ion exchanger with titanium phosphate.

20 grams of molten phenol are added to 26 grams of concentrated sulphuric acid and the mixture is heated for two hours at a temperature of 120° C. The sulphomass is cooled to a temperature of 20° C. and mixed with 8 grams of 40% aqueous solution of formaldehyde, and then with 30 grams of powdered titanium phosphate. The suspension prepared is slowly poured with vigorous stirring into 400 grams of oil heated up to a temperature of 90° C. The suspension is dispersed into small drops which harden within several minutes. The beads obtained are separated from oil, degreased and dried. 40 grams of the composite ion exchanger containing 35% of titanium phosphate are obtained. This sorbent efficiently sorbs cesium ions from aqueous solutions.

We claim:

1. A method of obtaining composite ion exchanger comprising a matrix of an organic carrier which is a cation exchange resin and an inorganic ion exchanger, comprising adding with mixing an active, powdered inorganic ion exchanger to the process of polycondensation of compounds selected from the group consisting of sulphonated phenols and from the group consisting of aldehydes thereby forming a suspension and dispersing the suspension into small drops which harden to form spherical beads.

2. The method as in claim 1 wherein the inorganic ion exchanger is selected from the group consisting of ferrocyanides of cobalt, iron, nickel, copper, manganese, zinc, titanium, cadmium, zirconium, chromium, vanadium, lead, molybdenum.

3. The method as in claim 1 wherein the inorganic ion exchanger is hydrated antimony pentoxide.

4. The method as in claim 1 wherein the inorganic ion exchanger is a phosphate of titanium or zirconium.

5. The method as in claim 1 wherein the inorganic ion exchanger is selected from the group consisting of natural or synthetic zeolites.

6. The method as in claim 1 wherein the inorganic ion exchanger is added in the form of small grains of linear dimensions not exceeding 1 mm, and the amount of the inorganic ion exchanger added is between 1 and 80% of the total mass of the composite ion exchanger formed.

7. The method as is claim 5 wherein the inorganic ion exchanger is mordenite.

8. The method as in claim 6 wherein the grains have linear dimensions less than 0.03 mm.

* * * * *